United States Patent [19]
Dunning et al.

[11] Patent Number: 5,860,900
[45] Date of Patent: *Jan. 19, 1999

[54] END EFFECTOR STORAGE STATION

[75] Inventors: Zenna J. Dunning, Spanaway; Mark F. Gabriel, Renton; James A. Shofner, Auburn, all of Wash.

[73] Assignee: The Boeing Company, Seattle, Wash.

[*] Notice: The terminal 30 months of this patent has been disclaimed.

[21] Appl. No.: 2,368

[22] Filed: Jan. 6, 1993

[51] Int. Cl.⁶ .................................................. B23Q 3/157
[52] U.S. Cl. .................. 483/1; 414/730; 483/55; 483/59; 901/41
[58] Field of Search .................. 483/54, 55, 59, 483/1; 901/30, 41; 414/730

[56] References Cited

U.S. PATENT DOCUMENTS

| | | | |
|---|---|---|---|
| 1,296,470 | 3/1919 | Bovard | 408/79 |
| 2,592,432 | 4/1952 | Kline et al. | 408/79 |
| 3,154,338 | 10/1964 | Leach | 294/88 |
| 4,486,928 | 12/1984 | Tucker et al. | 901/41 X |
| 4,598,453 | 7/1986 | Wills | 29/271 |
| 4,604,787 | 8/1986 | Silvers, Jr. | 483/55 |
| 4,613,262 | 9/1986 | Woods | 409/211 |
| 4,706,372 | 11/1987 | Ferrero et al. | 483/55 X |
| 4,858,334 | 8/1989 | Heitzman | 33/673 |
| 4,996,753 | 3/1991 | Jones | 414/730 |
| 5,044,063 | 9/1991 | Voellmer | 901/30 X |
| 5,165,829 | 11/1992 | Ross et al. | 409/125 |

FOREIGN PATENT DOCUMENTS

| | | | |
|---|---|---|---|
| 1363431 | 3/1963 | France . | |
| 2284410 | 4/1976 | France | 483/57 |
| 2578775 | 9/1986 | France | 901/41 |
| 60-249519A | 10/1985 | Japan . | |
| 103485 | 10/1922 | Switzerland . | |
| 1252164A | 2/1983 | U.S.S.R. . | |
| 1047649 | 10/1983 | U.S.S.R. | 483/59 |
| 1196261A | 7/1985 | U.S.S.R. . | |
| 1569167 | 6/1990 | U.S.S.R. | 483/57 |
| 12279 | of 1911 | United Kingdom . | |
| 9104130 | 4/1991 | WIPO | 483/59 |

*Primary Examiner*—William Briggs
*Attorney, Agent, or Firm*—J. Michael Neary

[57] ABSTRACT

An end effector storage station that stores end effectors in a horizontal and cantilevered position, each end effector being stored in a known location in space relative to a robotic manufacturing tool. The storage station comprises a plurality of storage cells, wherein an end effector holder is installed within each of the said storage cells. The storage station further including and end effector transport cell that includes an end effector transport cart and transport cart lift to accurately position the transport cart and attached end effector holder to a known and predetermined location in space.

13 Claims, 7 Drawing Sheets

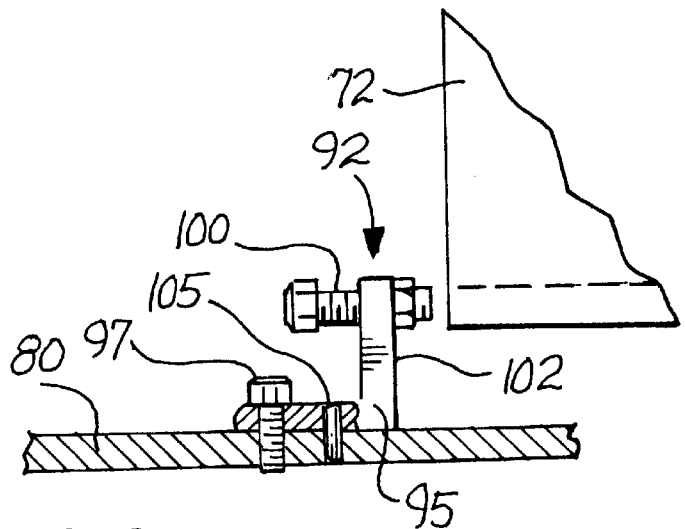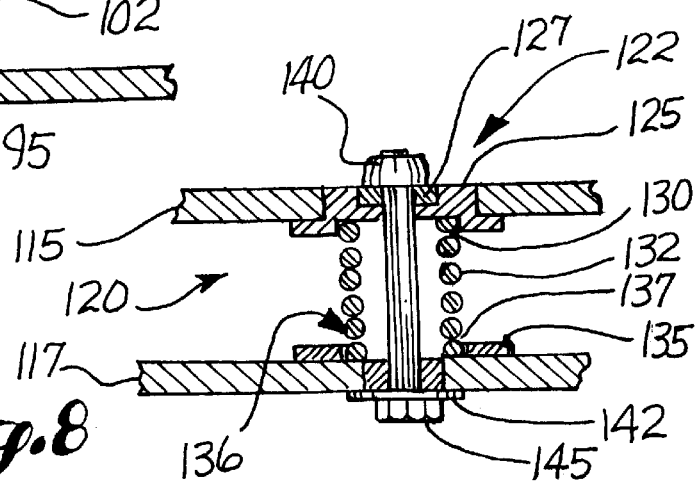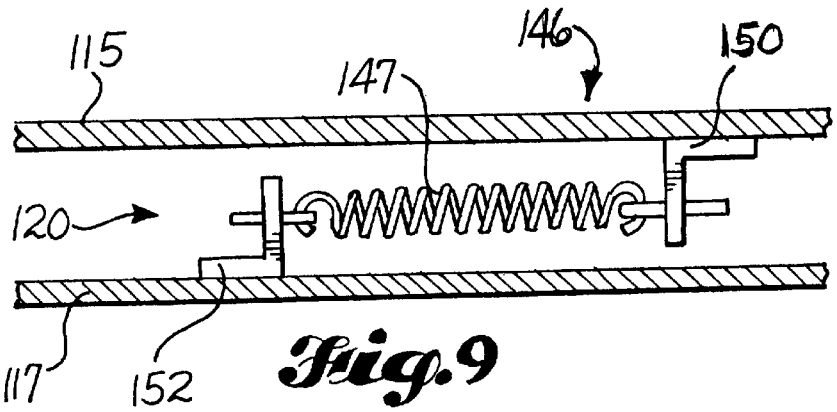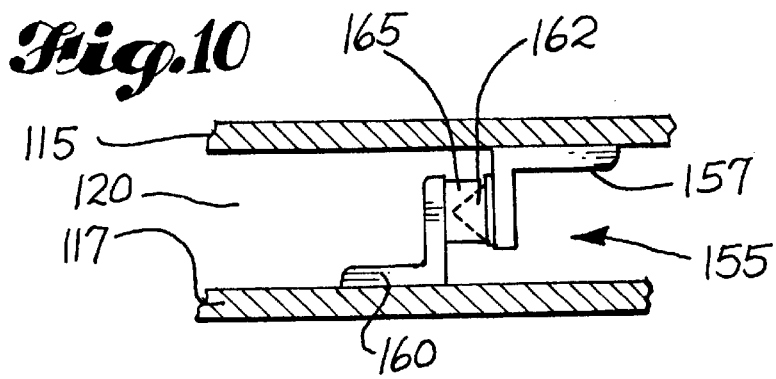

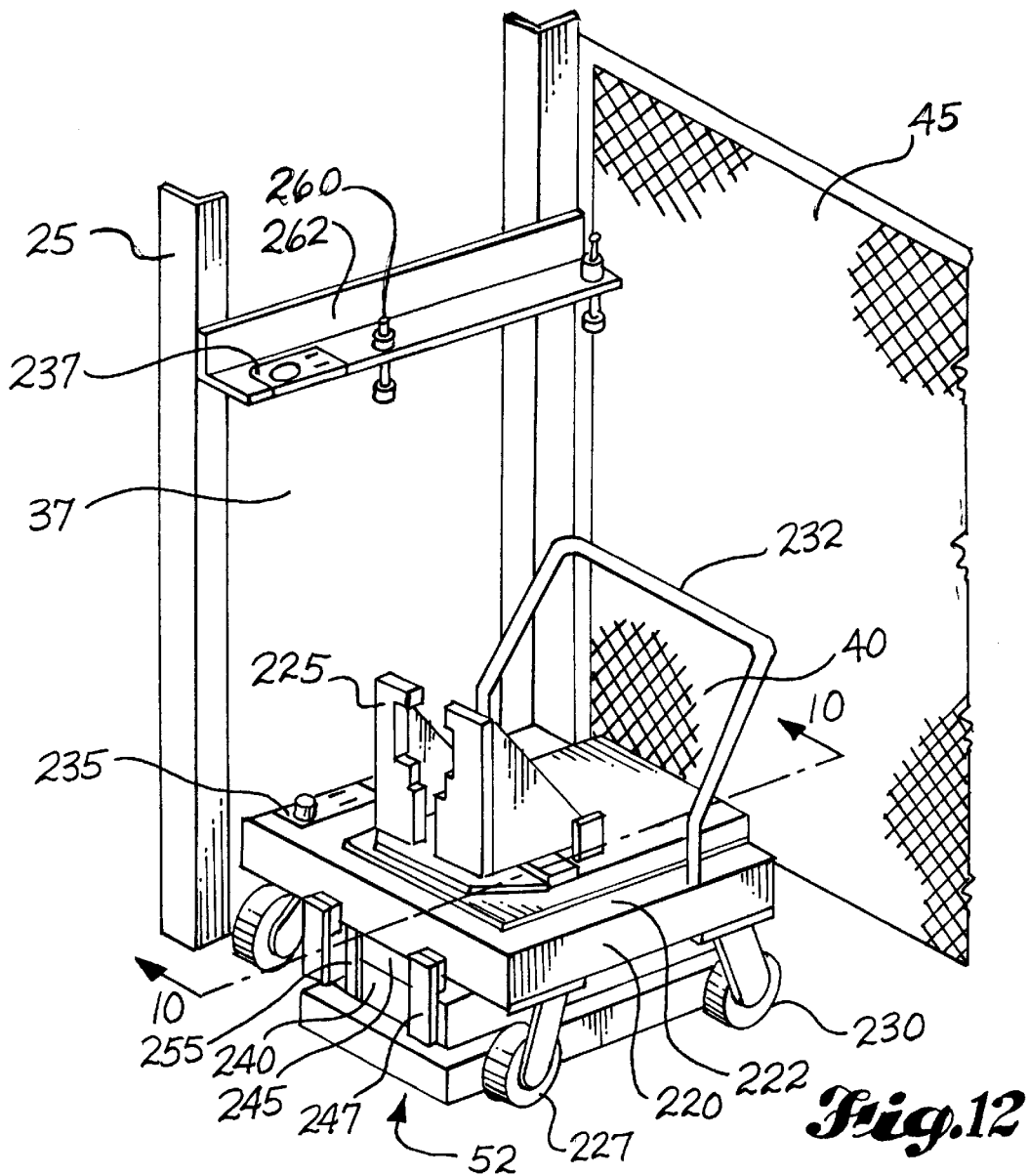
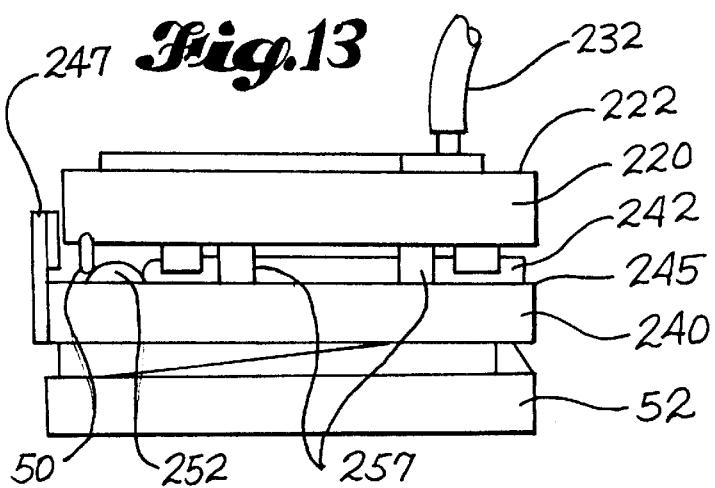

END EFFECTOR STORAGE STATION

BACKGROUND OF THE INVENTION

This invention relates to a method and apparatus to store machine tool end effectors, and more particularly to a method and apparatus to store one or more end effectors in a storage station with multiple storage cells.

Within the manufacturing industry, many manufacturing processes utilize computer or numerically controlled machine tools. These tools, which often utilize robotic arms, are beneficial in terms of improving product quality, increasing time efficiency, reducing labor requirements, and alleviating unnecessary tooling costs. The benefits occur, in part, because many versatile robotic manufacturing tools are capable of completing more than one manufacturing task, such as drilling and routing, while the work piece remains in one position within the manufacturing station. The extent or type of manufacturing process available partially depend upon the sophistication of the tool and robotic arm. A fairly sophisticated NC machine and associated robot arm may be programmed to pick up one end effector, complete a manufacturing task, replace the end effector, and pick up a different end effector to complete a different task.

To accomplish these multiple manufacturing steps, a plurality of end effectors must be positioned at an exact location and orientation in space that correspond with information programmed in the NC machine tool. Each end effector must also be stored within the robot arm's longitudinal and radial reach.

Manufacturing industry continuously strives to reach machining process goals that include reducing manufacturing time, increasing efficiency, avoiding wasted machine movement, and minimizing the manufacturing tool's floor space requirement. As such, a highly desirable end effector storage station is one that locates and stores a plurality of end effectors in a manner that facilitates efficient and accurate connections with the robot arm.

In the past, multiple end effectors have been stored in large end effector racks. Typically the end effectors sit such that the end effectors' longitudinal axis is vertically oriented with the end effectors connecting plate faces up. Each vertically aligned end effector must have enough surrounding space that allows the robotic arm access to engage the end effector. Once engaged, the robot must pick up the end effector vertically out of a vertical holder, and then withdraw and/or rotate the end effector to the programmed orientation.

Past end effector racks also usually stored end effectors in vertically oriented holders. These holders utilized gravity to properly hold the end effector in the rack, and springs to absorb impact unwittingly inflicted by the robot arm. Such impact usually occurs while engaging, disengaging, replacing, or removing the end effector.

Vertically orienting end effector has several disadvantages. The robot arm must move along a greater range of motion. The space around each end effector must be greater to allow the robotic arm adequate access to the end effectors and to ensure against inadvertent damage while picking up or replacing the end effector into the holding rack. Greater space requirements generally result in the need for more manufacturing floor space to accommodate all the desired manufacturing processes. In addition, excess robotic arm movement and larger end effector holding racks generally translates into using a larger or more bulky manufacturing tool to satisfy design requirements.

SUMMARY OF THE INVENTION

Accordingly, it is an object of this invention to provide an end effector storage station that utilizes a plurality of end effector storage cells while reducing the required amount of manufacturing floor space.

Another object of the invention is to provide an end effector storage station with vertical stacks of end effector storage cells; the vertical stacks spatially arranged to minimize vertical and radial travel parameters of the manufacturing tool and associated robotic arm.

Yet another object of the invention is to provide an end effector storage station that stores each of a plurality of end effectors in a horizontal and cantilevered position in a storage cell. This storage position effectively reduces the necessary area around each end effector to accommodate the path travelled by the robotic arm.

It is yet another object of this invention to provide an end effector storage station with a plurality of end effector storage cells. Each storage cell having a predetermined type of end effector holder to secure an end effector in a horizontal and cantilevered position and in an exact location in space recognized by a programmed machine tool. These storage cells and end effector holders being configured to secure at least one of a plurality of end effector.

It is yet another object of this invention to provide an end effector storage station that securely holds the end effectors and provides a sufficient reaction force to enable the robot arm to exert a force on the end effector connector that will establish the mechanical, electrical, pneumatic, and hydraulic connections at the associated couplings.

It is yet another object of the invention to provide a method of storing each of a plurality of end effectors in an end effector storage cell within a storage station. The end effectors are held in a horizontal and cantilevered position such that a robotic arm may engage or disengage an end effector in an efficient manner.

It is yet another object of the invention to provide an end effector storage station with a storage cell to accommodate an end effector transport, the transport having an end effector holder mounted thereto, onto which an end effector may be secured and transported to or from the storage station.

It is yet another object of the invention to provide a method of mounting an end effector onto an end effector transport within an end effector storage cell, such that the transport may be removed from the storage station, subsequently returned, and positioned in an exact location in space recognized by a programmed machine tool. Such a method is effectively allows the interchange of different end effectors into the storage cell and into an exact spatial location without position inaccuracies, undesirable time loss, or wasted machine motion.

These and other objects of the invention are obtained in using an end effector storage station capable of storing a plurality of end effectors in vertically stacked sets of storage cells positioned to correspond to a robot arm's vertical and radial reach. The storage cells contain end effector holders that secure an end effector in a horizontal and cantilevered position until the particular end effector is selected by a programmed machining tool and robot arm. These objects are further achieved by the above end effector storage station wherein the station has an end effector transport cell that accommodates an end effector transport. The transport enters and exits a transport cell in the storage station through an access area and may be positioned into a known location in space by positioning or lifting means.

The present invention also allows for horizontal and cantilevered storage of different end effector types within one end effector storage station. This storage ability facilitates using a sophisticated programmable machining tool and robot arm that utilizes two or more types of end effectors. Thus, each storage cell may store a particular end effector needed to complete a manufacturing step that an adjacent end effector is unable to complete.

DESCRIPTION OF THE DRAWINGS

The invention and its many attendant objects and advantages will become better understood upon reading the following detailed description of the preferred embodiment in conjunction with the following drawings, wherein:

FIG. 5 is a cross-section view of an adjustable stopping mechanism to limit inward linear travel of end effector holding jaws.

FIG. 8 is a cross-section view of separating means between a top and bottom plate of an end effector holder.

FIG. 9 is a cross-section view of a biased spring mounted to and between the top and bottom plate of an end effector holder.

FIG. 10 is a cross-section view of top and bottom plate aligning means mounted to a top and bottom plate of an end effector holder.

FIG. 12 is an isometric view of an end effector transport and an end effector holder mounted thereon positioned on lifting mechanism within the storage station's transport cell.

FIG. 13 is a cross-section view through the transport and lifting mechanism shown in FIG. 12 with the end effector holder not shown.

DETAILED DESCRIPTION OF THE PREFERRED EMBODIMENT

Figure 1:
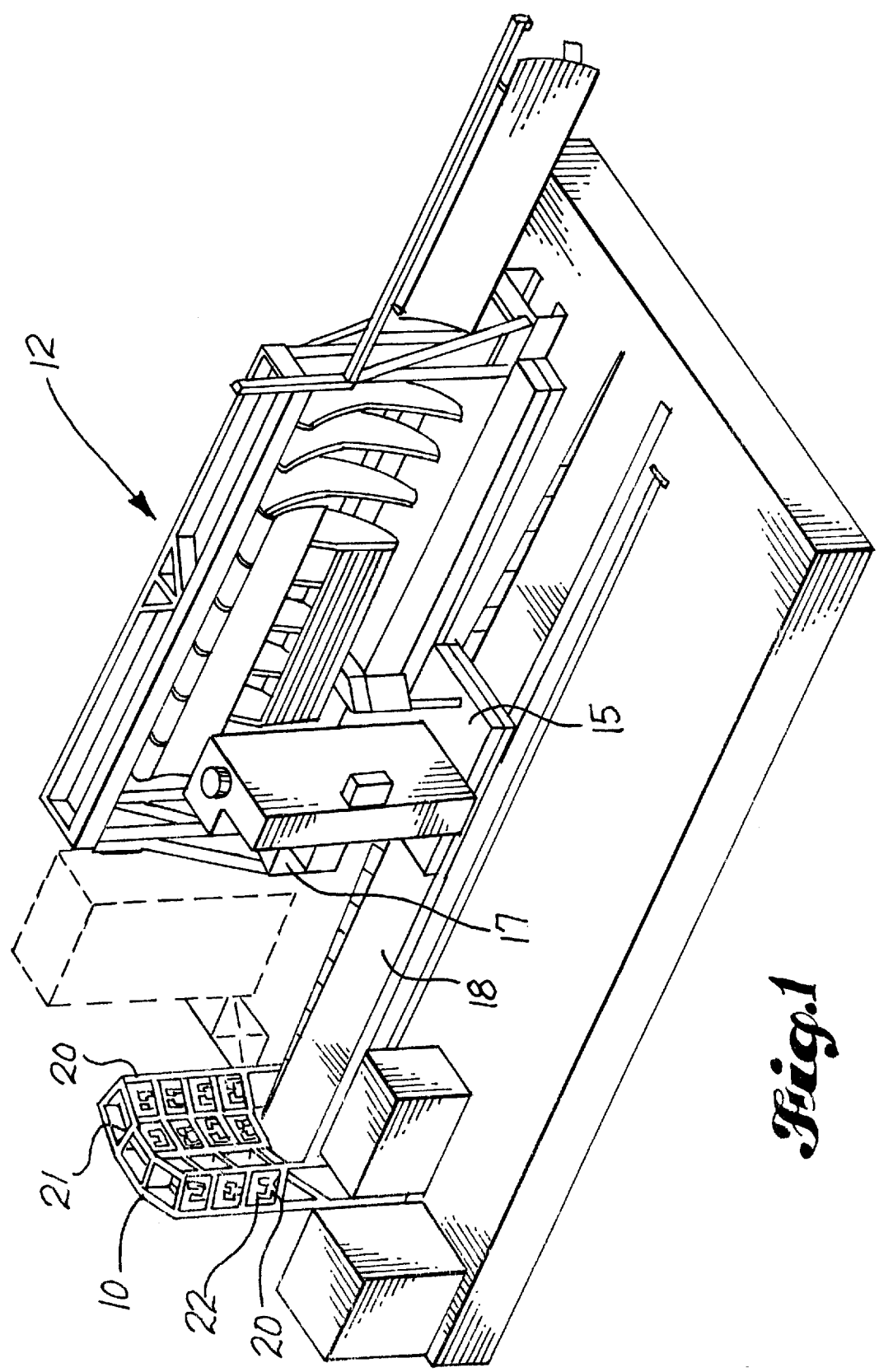
FIG. 1 is a schematic view of a manufacturing cell showing an end effector storage station at the end of an automated machine tool's travel path.

Referring now to the drawings, wherein like reference characters designate identical or corresponding parts, and more particularly to FIG. 1 thereof, an end effector storage station 10 is shown in a manufacturing station 12 that utilizes a machine tool 15 for various machining processes. These processes may be accomplished by a machine tool 15 that controls a robot arm 17 that operates any one of many types of end effectors. In the preferred embodiment, the storage station 10 is incorporated in and positioned at the end of an aircraft fuselage panel assembly cell as disclosed in U.S. patent application Ser. No. 07/964,533, the disclosure of which is incorporate herein by reference.

Storage station 10 stores a plurality of end effectors 20 in a horizontal and cantilevered position. This position provides easy access by the machine tool 15 to insert the end of robot arm 17 into the receptacle of the desired end effector 20. An end effector holder, discussed in detail below, attached to storage station 10 securely holds end effector 20 in place. The end effector holder also exerts a reaction force to a force exerted by the robot arm 17 on the end effector 20 that is necessary to establish desired mechanical, electrical, pneumatic, and hydraulic connections at associated couplings.

After engagement, the robot arm 17 may remove the end effector 20 from the storage station 10, perform a desired machining operation within manufacturing station 12, replace the end effector 20 into the storage station 10, and pick up a different end effector 21 for the next manufacturing process.

Figure 2:
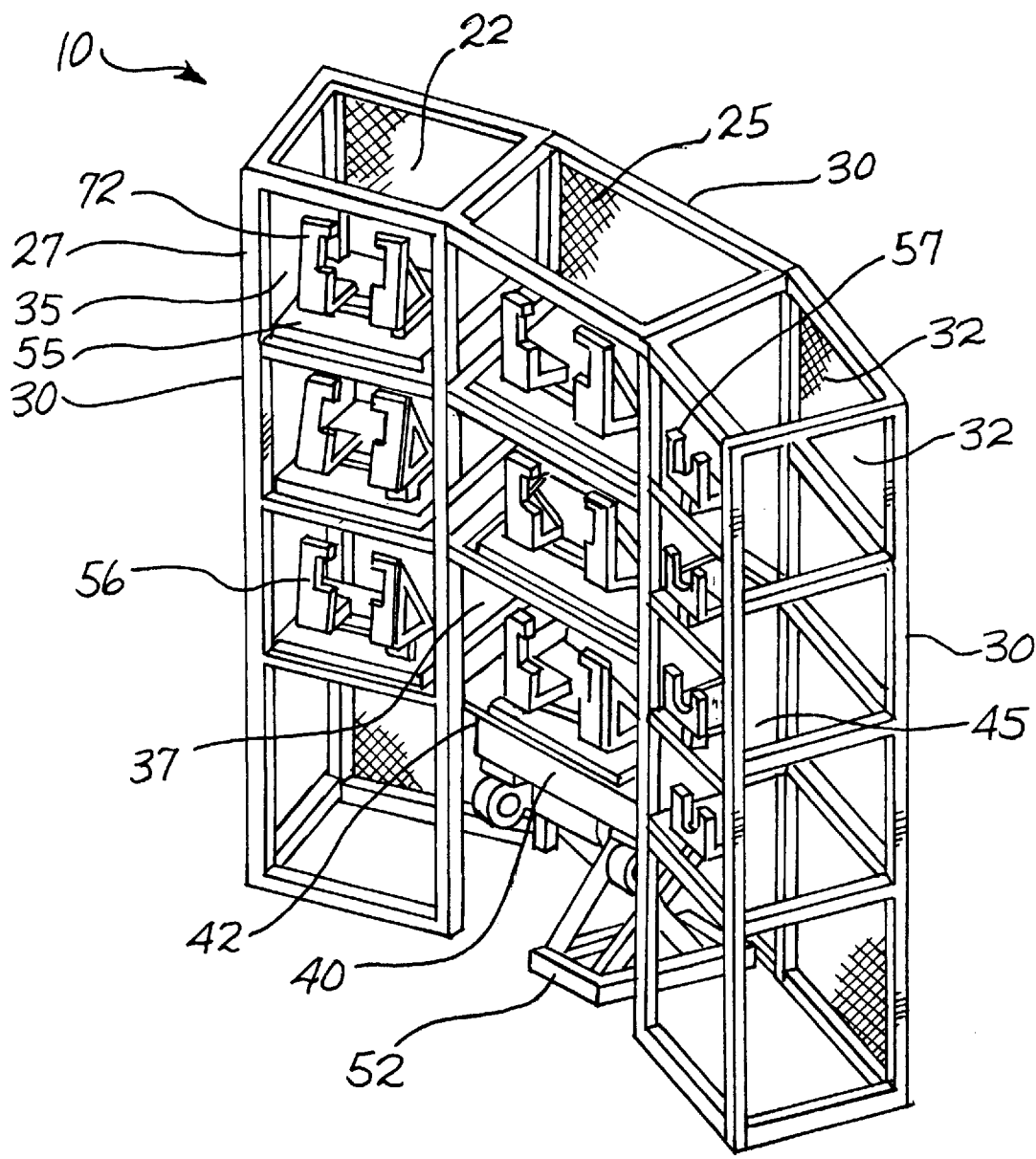
FIG. 2 is an isometric view of an end effector storage station in accordance with this invention.

As seen in FIG. 2, the storage station 10 comprises a storage station frame 25 forming a plurality of end effector storage cells 22. Frame sections 27, held together with fasteners, allows for frame adjustment because the frame sections 27 may be assembled or reassembled to form as many storage cells 22 as desired. In the preferred embodiment, frame sections 27 are made from extruded aluminum stock and fastened together with a universal fastening assembly. The resulting frame 25 consists of three vertical stacks 30 and 31 of storage cells 22.

Spatial orientation of the stacks 30 and 31 depend upon the specific travel parameters of the machine tool 15 and robot arm 17. A manufacturing cell that utilizes a Jo'Mach 16/3B CNC machine tool incorporates an end effector storage station 10 with storage cells 22 for larger multifunction end effectors stacked three high. Storage cells that hold smaller end effectors, such as the CAT 40 tool, are stacked four high. These stacks 30 and 31 of storage cells 22 effectively utilize the robot arm's full vertical range of motion and maximizes use of valuable manufacturing floor space.

The stacks 30 and 31 are further arranged to accommodate the radial limitations of the robot arm's reach. In the preferred embodiment, each outer stack 31 is oriented such that the stack's front face is disposed at a thirty degree angle relative to the front face of center stack 30. The result is three stacks 30 and 31 of storage cells 22 positioned to form an arc corresponding to the vertical and radial path traveled by the robot arm 17.

A stack 30 and 31 may also be configured to include an end effector transport cell 37 with access to the cell through an access means, such as a door 45. In the preferred embodiment, transport cell 37 occupies the bottom section of the center stack 30. As discussed in detail below, an end effector transport, such as a cart 40, with an end effector holder 42 mounted thereon, may be positioned into the transport cell 37 through door 45 in the back of storage station 10. Once in the transport cell 37, the cart 40 may be raised or positioned into an operative position by a cart positioning unit 52, described below, in the transport cell 37.

Frame enclosure panels 32 mount to the frame 25 to enclose the back and sides of the frame 25 and the storage cells 22. Panels 32, preferably made from a sturdy transparent material such as plexi-glass, protect the stored end effectors 20 from dust and accidental impacts while providing adequate access for the robot arm 17 through the storage cell's open front face 35.

An end effector holder 55 may be installed in a storage cell 22 to hold an end effector 20 in a predetermined location in space and in a horizontal and cantilevered position. The versatility of storage station 10 allows for installation of the same type of holder in each storage cell, a different type of holder in each cell, or any combination thereof. In the preferred embodiment, two types of end effector holders 55 are incorporated: a multifunction end effector holder 70 and a CAT 40 tool holder 180, discussed in detail below.

Figure 3:
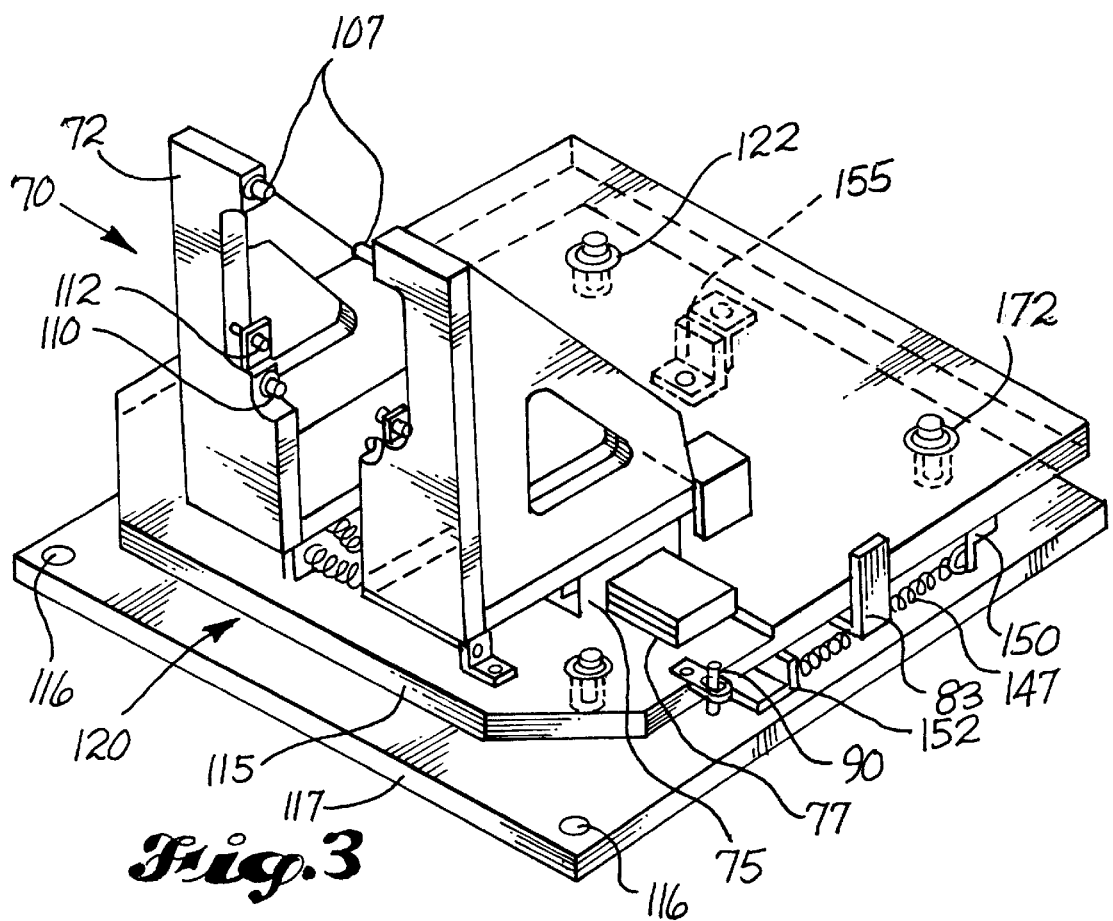
FIG. 3 is an isometric view of a first type of end effector holder within an end effector storage cell.
Figure 4:
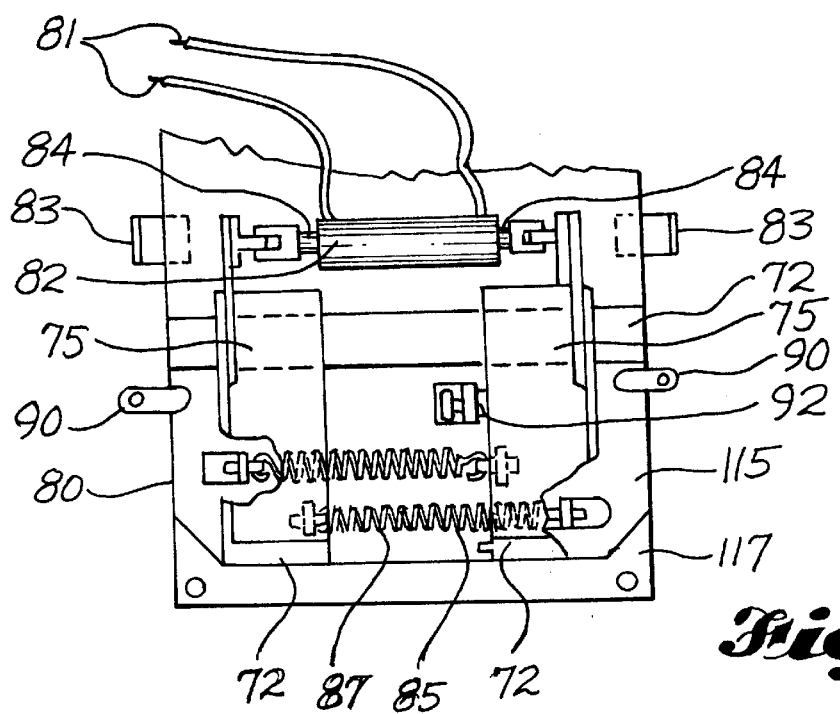
FIG. 4 is a partially broken away plan view of the end effector holder shown in FIG. 3.

Turning now to FIG. 3 and FIG. 4, a first type of end effector holder 70 is shown that securely holds an end effector in a horizontal and cantilevered position. Holder 70 includes holding jaws 72 coupled to a guiding assembly to guide the holding jaws 72 between an open release position and a closed holding position. The guiding assembly includes a linear bearing assembly 75 coupled to guide rail 77 fastened to a base 80, thus enabling holding jaws 72 to move laterally along the guide rail 77. Each holding jaw 72 is coupled to its own linear bearing assembly 75 permitting independent motion of the holding jaw 72.

Holding jaws 72 are coupled together by an opening, such as an air cylinder 82 with a piston 84 connected to each holding jaw 72. When the air cylinder 82 is activated by a central computer controller, compressed air is delivered to the air cylinder 82 through air hoses 81 that are connected to an air source (not shown). The compressed air forces the pistons 84 and connected holding jaws 72 outward from a closed holding position to an open release position. Accordingly, each holding jaw 72 slides outward to the ends of guide rail 77.

To limit the lateral travel of holding jaws 72, holder 70 also includes holding jaw travel limiters, such as an outside stop 83 and an inside stop 92 (discussed below). The outside stop 83 effectively blocks the holding jaws 72 from extending outward beyond a predetermined position.

Holding jaw sensors 90, such as proximity sensors, are coupled to the mounting base 80 detect when holding jaws 72 have reached the open release position. Sensors 90 are linked to a central computer control system that controls the manufacturing station, including the machine tool 15, the robot arm 15, and the holding jaws 72. The robot arm 17 will not attempt to insert the end effector 20 between holding jaws 72 until sensors 90 detect holding jaws 72 in the proper position.

Each holding jaw 72 is connected to a biasing means such as an extension spring 85 and 87 attached to the base 80. The extension springs 85 and 87 are biased in the closed holding position such that the springs 85 and 87 constantly pull holding jaws 72 from an open position toward a normal closed position. Thus, if power to the end effector holder 70 terminates or is disrupted, the end effector will remain safely secured in the closed holding jaws 72.

In the preferred embodiment, extension spring 85 has a spring rate greater than that of extension spring 87. Accordingly, when compressed air is allowed to bleed from the air cylinder 82, extension spring 85 pulls the holding jaw 72 to which it is connected to the closed position just before extension spring 87 pulls the connected jaw 72 to the closed position. This asymmetric closure enables holding jaws 72 to consistently return to the precise same closed and centered position recognized by the central computer controller, because the jaw 72 attached to extension spring 85 closes until an adjustable hard stop 92 (discussed below) is contacted.

As the holding jaws 72 translate along guide rail 77 from the open release position to a closed holding position, an inside stop, such as an adjustable hard stop 92, on base 80 blocks the holding jaws 72 from sliding past a desired closed position. The adjustable hard stop 92 acts to prevent alignment problems between holding jaws 72 and the inserted end effector. As seen in FIG. 5, adjustable hard stop 92 comprises an angle bracket 95 coupled to the base 80, and secured thereto by a fastener 97. A threaded socket headcap screw 100 extends through the vertical leg 102 of bracket 95 such that the screw 100 may be adjusted to vary the amount by which the screw protrudes past the vertical leg 102. When properly adjusted, the screw 100 makes contact with holding jaws 72 upon reaching the fully closed holding position.

A spring pin 105 is installed through the angle bracket 95 and base 80 to prohibit or minimize undesired alignment changes due to impact between holding jaws 72 and the adjustable hard stop 92. Thus, notwithstanding impacts, the adjustable hard stop 92 assures that holding jaws will consistently return to the same location when translating from the open release position to the closed holding position.

Figure 6:
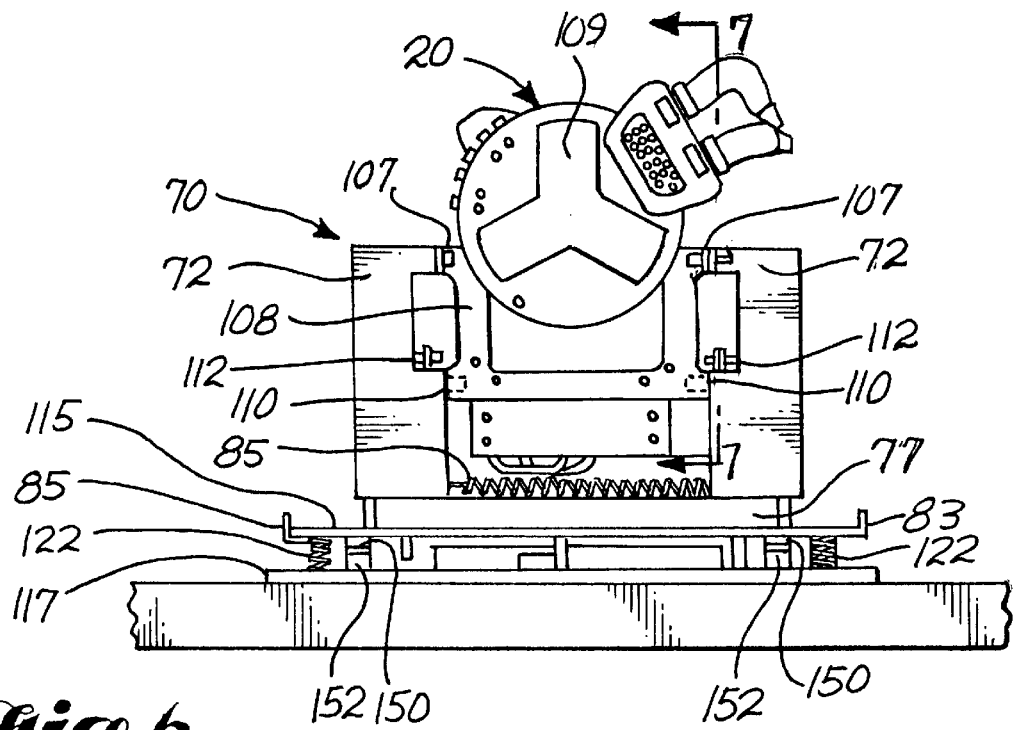
FIG. 6 is a front view of a multifunction end effector secured in an end effector holder.
Figure 7:
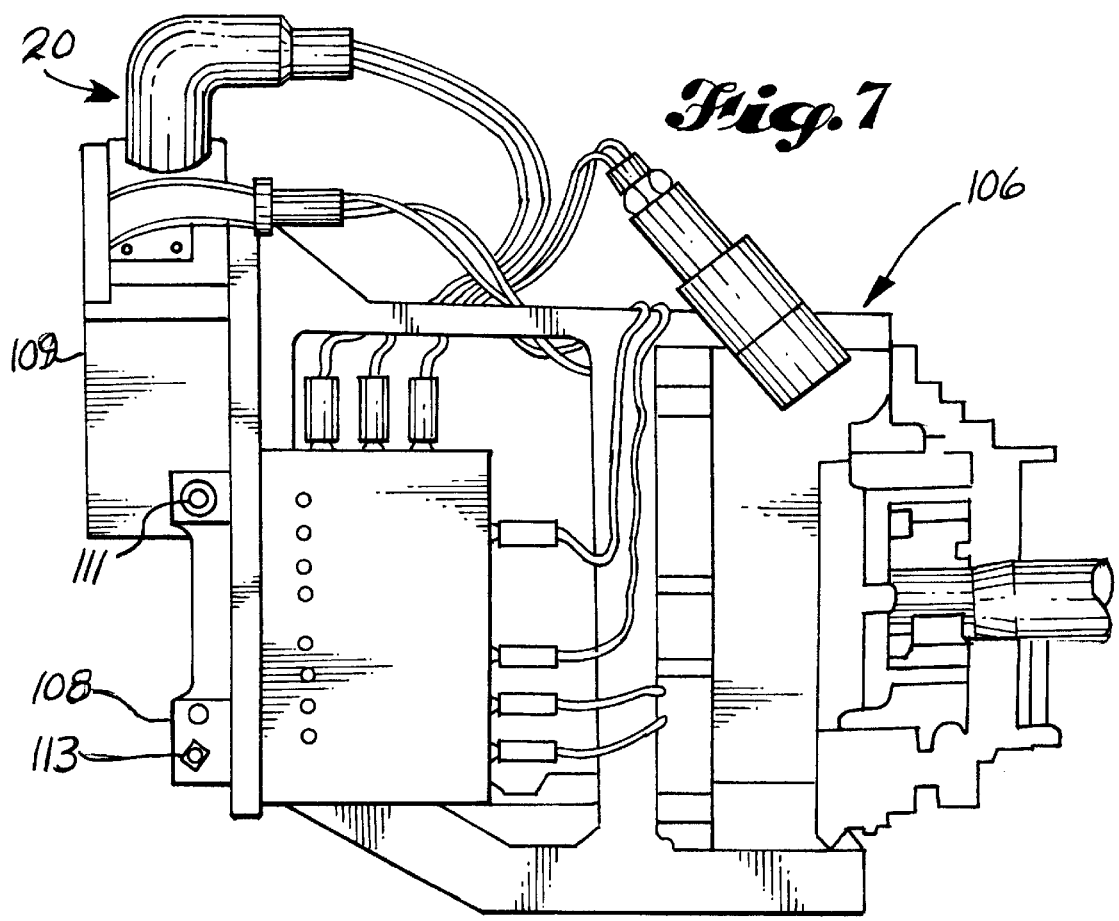
FIG. 7 is a cross-section view along line 7—7 of the end effector in FIG. 6.

As holding jaws 72 slide along guide rail 77 from the open position, as seen in FIG. 3, to the closed position, as seen in FIG. 6, support pins 107 and 110 on each holding jaw 72 engage the end effector 20 shown in FIG. 7. The end effector 20, as disclosed in U.S. Patent Application by inventors Dunning, et al., titled PART POSITIONING AND DRILLING END EFFECTOR, filed concurrent herewith, the disclosure of which is incorporated herein by reference, includes an end effector body 106 and robot arm connector 109 attached to an end effector holding plate 108 Plate 108 has pin receiving holes 111 and 113 shaped to accept support pins 107 and 110 when holding jaws 72 are in the closed position. Accordingly, when the robot arm 17 releases and separates from engaging face 109 of end effector 20, support pins 107 and 110 carry the end effector's weight while holding the end effector in the exact location in space in the desired position.

Referring back to FIG. 6, end effector sensors 112 are located on each of the holding jaws 72 to sense or detect the presence of an end effector. The sensors 112, which are coupled to the central computer controller, utilize Hall's effect to detect the presence of an end effector 20. When sensors 112 detect the presence of a properly positioned end effector relative to the holding jaws 72, the end effector 20 may be released from the robot arm 17. Such a procedure protects against inadvertent early release of an end effector.

As a safety feature in the preferred embodiment, support pins 107 have a bullet shape and support pins 110 have a diamond shaped cross sectional area. Different pin shapes ensure proper pin engagement with holes 111 and 113 in plate 108 and proper end effector alignment. As such, the holes 111 are shaped to receive a bullet pin, and holes 113 are shaped to hold a diamond pin.

As indicated above, end effector holder 70 includes a mounting base 80. This base includes a top plate 115 attached to the end effector holder 70, and a bottom plate 117 fastened or bolted to the storage station frame 25 through axial bores 116 (see FIG. 3). Top plate 115 and bottom plate 117 are separated by plate separators 122 such that a gap 120 exists between the plates.

Turning now to FIG. 8, a plate separator 122 is shown mounted between top plate 115 and bottom plate 117. A separator housing 125 with a spherical bearing 127 and a shoulder 130 is mounted to the bottom side of top plate 115. The shoulder 130 retains impact absorption means, such as a compression spring 132, against the top plate 115. A spring plate 135 with a bore 136 therethrough is fastened to the plate 117. The bore's diameter is slightly larger than compression spring's diameter such that the edges of the bore 136 form a spring retaining shoulder 137 when spring plate 135 is attached to the bottom plate 117 and the compression spring 132 is axially aligned with the bore 136.

A threaded fastener 140 is inserted through the separator housing 125, the compression spring 132 and the spring plate 135, and is fastened in place by a washer 142 and a threaded nut 145. Accordingly, threaded nut 145 may be tightened down on fastener 140 such that top plate 115 and bottom plate 117 are drawn together until the desired size gap 120 is achieved, and the compression spring 132 is effectively retained between the top plate 115 and bottom plate 117. In the preferred embodiment, the base 80 utilizes four plate separators 122 mounted at the corners. The plate separators 122 effectively absorb downward impacts and return the top plate 115 to its original position, thereby assuring the end effector holder 70 and holding jaws 72 will return to the exact same position in space after an impact with a downward vertical component.

Holder 70 also absorbs impacts or vibration with horizontal components. As seen in FIG. 7, an extension spring 147, located between top plate 115 and bottom plate 117, is biased to a forward nominal or normal position. Extension spring 147 is attached to a first angle bracket 150 coupled to bottom plate 117, and to a second angle bracket 152 coupled to top plate 115. The extension spring 147 is installed such that the spring is biased and attempts to draw first and second angle bracket 150 and 152 together. Mounting base 80, in the preferred embodiment, utilizes two extension spring assemblies 146 mounted near the outer edges of base 80, thereby allowing top plate 115 to move forward and backward relative to firmly secured bottom plate 117.

To assure proper realignment of top plate 115, an alignment assembly 155, as seen in FIG. 8, is installed between top plate 115 and bottom plate 117 such that a top alignment component 157 communicates with a bottom alignment component 160. Top alignment component 157 is secured to the top plate 115, and the bottom alignment component 160 is secured to the bottom plate 117. Top alignment component 157 contains an alignment cone 162 which fits into an alignment cone receiver 165 integral to the bottom alignment component 160. The preferred embodiment incorporates three alignment assemblies 155.

When installed, extension springs 147 (from FIG. 9) pulls top alignment component 157 and accompanying alignment cone 162 into the alignment cone receiver 165 of bottom alignment component 170. Top plate 115 is thus blocked from further motion by the bottom alignment component 160. In addition, the alignment cone 162 does not fully pull out of alignment cone receiver 165 even though alignment cone 162 moves away from alignment cone receiver 165 when top plate 115 moves. Thus, as the extension spring 147 pulls on the top plate 115, the alignment assembly 155 aligns the top plate 115 back to its forward or nominal or normal position.

The top and bottom alignment components 157 and 170 also assist in the decoupling of end effector's connector 109 (see FIG. 6) from the robot arm 17. A fairly substantial pulling force is needed to separate the robot arm and end effector 20. When the robot arm pulls away from an end effector 20 secured in holding jaws 72, the bottom alignment component blocks the forward alignment component and attached top plate 117 from being pulled beyond the normal position. Accordingly, the end effector holder 70 provides enough resistance or reaction force to hold the end effector 20 while the robot arm disengages.

Figure 11:
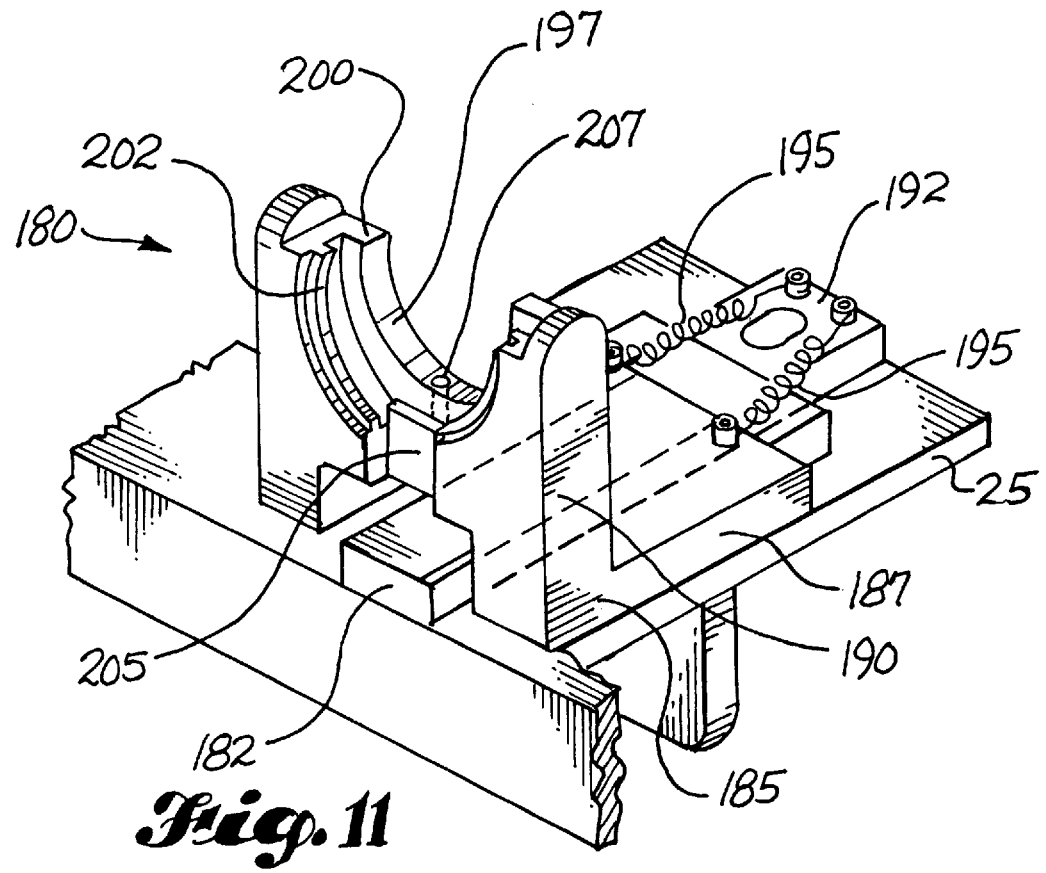
FIG. 11 is an isometric view of a second end effector holder within an end effector storage cell.

Turning now to FIG. 11, a second type of end effector holder 180 is shown coupled to the storage station frame 25. While the first end effector holder 70 described above secures a first type of end effector in a horizontal and cantilevered position, such as a multifunction end effector 20, this second type of end effector holder 180 secures a second type of end effector 210, such as a CAT 40 tool (shown in FIG. 11A and discussed below), in a similar horizontal and cantilevered position.

A linear guide rail 182 aligned in the forward and backward direction is secured to frame 25. An end effector holding plate 185, comprising a horizontal leg 187 and a vertical leg 190, is coupled to a holding plate translating mechanism, such as a linear bearing 181, that rides along the linear guide rail 182. Thus, holding plate 185 easily translates or moves in the forward or backward direction along guide rail 182.

A holding plate blocking mechanism 192 that is coupled to the frame 25 behind guide rail 182 acts to block the movement of holding plate 185 beyond a predetermined position. Blocking mechanism 192 is preferably made of a flexible resilient material, such as rubber, that absorbs impact, vibration, or excessive backward force exerted by holding plate 185. The resiliency of the blocking mechanism 192 is needed to consistently and accurately return the holding plate 185 to a normal or nominal starting position. This normal starting position accurately locates the end effector 210 mounted on holder 180 in a known and accurate position in space that is recognized by the machine tool and robot arm.

Retracting means, such as a biased spring 195, act as a position normalizing mechanism to return the holding plate 185 to a predetermined position. Spring 195 is biased in the backward direction such that holding plate 185 is always drawn back against the blocking mechanism 192, thereby reaching the normalizing position recognized by the machine tool as indicated above. In the preferred embodiment, two biased springs 195 are attached to blocking mechanism 192 and holding plate 185.

Figure 11A:
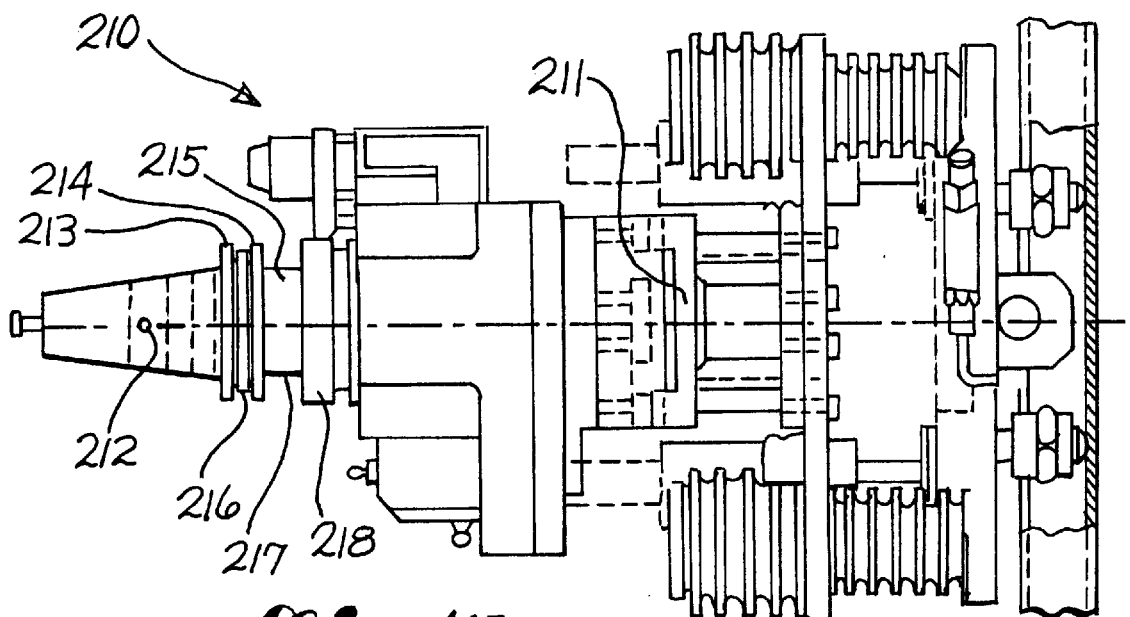
FIG. 11A is a plan view of a second type of end effector that is held in place by the end effector holder shown in FIG. 11.

The vertical leg 190 of the holding plate 185 comprises a cutout 197 shaped to communicate with the end effector 210 when set into the holding position. In the preferred embodiment, cutout 197 is a semicircle or saddle shape that corresponds to the shape of an end effector 210, as shown in FIG. 11A and as disclosed in a U.S. Patent Application by inventor Peter D. McCowin, titled WORKPIECE POSITIONING AND DRILLING END EFFECTOR, filed Dec. 23, 1992, the disclosure of which is incorporated herein by reference.

End effector 210 includes an end effector body 211 coupled to a conical shank or spindle 215 to which the robot arm connects. Spindle 212 further comprises two adjacent annular rings 213 and 214 around a shaft 215 positioned to form an annular channel 216 therebetween. A deeper annular groove 217 about shaft 215 is formed between ring 214 and a collar 218.

Referring to both FIG. 11 and FIG. 11A, cutout 197 includes end effector retaining means, such as a semicircular radially extending annular flange 200 and a smaller semi-circular radial ridge 202. When end effector 210 is positioned in cutout 197, the flange 200 fits snugly into the deeper annular groove 217, and the radial ridge sets into annular channel 216 such that end effector 210 is secured in a horizontal and cantilevered position. Accordingly, the end effector 210 is securely held in position by gravity and friction at the interface between flange 200 and groove 217 and between ridge 202 and channel 216. A desired radial orientation of end effector 210 relative to the holding plate 185 is achieved by a key 205 coupled to vertical leg 190 that fits into a key receiving slot (not shown) in the annular channel 216.

An end effector position sensor 207, preferably a proximity sensor, is coupled to the cutout 197 to sense when an end effector 210 is properly positioned in cutout 197 and on flange 200 and ridge 202. Once in the desired position, the end effector remains secured in a cantilevered and horizontal position. Until end effector sensor 207 detects the presence of an end effector, however, the robot arm 17 will not release or separate from the end effector 210.

Turning now to FIG. 12, an end effector transport storage cell 37 is shown with an end effector transport, such as a cart 40, positioned therein. This transport cell 37, in the preferred embodiment, is located in the bottom cell of the central vertical stack 30 of storage cells 22 (see FIG. 2). The cart 40 may be positioned within the transport cell 37 through transport access means. The preferable access means consists of a door 45 in the back side of the storage station 10 that allows ingress and egress of the cart 40 to or from the transport cell 37 without disrupting or interfering with the robot arm 17.

Cart 40 comprises a movable carrier 220 having an end effector holder 225 coupled to a top surface 222 of carrier 220. While holder 225 may comprise the second end effector holder 180 shown in FIG. 11, the preferred embodiment utilizes the first end effector holder, known as a multifunction end effector, shown in FIG. 3. The holder 225 is typically secured on the movable carrier 220 with bolts or other suitable fasteners. In addition, the carrier 220 has rigid casters in the front, swivel casters 230 mounted to the rear of cart 220, and a handle 232 near the rear for pushing or pulling the cart.

The transport cart 40 also has a multicoupling unit 235 mounted on the top surface 222. When the cart 40 is maneuvered into the correct position over a transport positioning unit 52 and moved or lifted into a predetermined position, discussed below, a power access multicoupling unit 235 engages a multicoupling unit receiver 237 integral to the storage station frame 25. These multicoupling units 235 and 237, when engaged, provide power, such as electricity and compressed air, to the holder 225, thereby rendering the holder 225 operational. When multicoupling units 235 and 237 are not connected, the holder 225 is non-operational and remains in the closed position thereby assuring an end effector mounted therein will not be inadvertently released or dropped.

When cart 40 is positioned or wheeled into the transport cell 37, the cart 40 sits over the positioning unit 52 that lifts the cart 40 within transport cell 37 into a predetermined position in space known by the programmed machine tool and robot arm. As a result, the transport cell 37 may also be utilized as an active end effector holding cell during a manufacturing process.

In the preferred embodiment, the cart positioning unit 52 comprises a scissor lift 240 that raises the transport cart 40 to an active position or lowers the cart to an inactive, mobile position. As seen in FIG. 13, the positioning unit 52 also includes transport aligning means to properly align the cart 40 within the storage cell 37. The transport aligning means includes cart guide rails 242 mounted on the top surface 245 of scissor lift 240 to laterally align transport cart 40 prior to lifting. Guide cam rollers 246 mounted to the bottom surface of cart 40 roll along guide rails 242 as cart 40 is pushed over the scissor lift 240, thereby ensuring accurate lateral placement of the cart 40 over the lift. The transport aligning means further includes cart stops 247 that prevent the cart 40 from moving forward past a predetermined position, thereby achieving the proper longitudinal positioning of the transport.

The cart 40 has a spring loaded ball detent mechanism 250 mounted to the underside of cart 40. After the cart 40 is properly positioned over the lowered scissor lift 240, as discussed below, and the lift 240 rises to contact the cart 40, the ball detent 250 engages a cam 252 mounted to the top surface 245 of scissor lift 240. When engaged, the ball detent mechanism 250 prevents the cart 40 from becoming inadvertently dislodged from the scissor lift 240.

A cart position sensor 255, as shown in FIG. 12, is mounted to the front of scissor lift 240 to detect or sense when the cart 40 has been reached the desired longitudinal positioned over the scissor lift 240. When the sensor 255 indicates the cart 40 is in position, the central computer controller activates a hydraulic motor that raises the scissor lift 240 until contact is made between the lift 240 and the cart 40. The cart 40 then rests on urethane pads 257 on the top surface 245 of scissor lift 240. The scissor lift 240 continues to raise the cart 40 until contact is made with preset levelling pads 260 coupled to upper stop rails 262 on frame 25. Once the cart 40 engages levelling pads 260 and the multicoupling units 235 and 237 engage each other, the end effector holder 225 will be operational and located position known and recognized by the central computer controller.

As a safety feature, the scissor lift 240 cannot operate to move the cart 40 until the door 45 has been properly closed. This prevents inadvertent operation of the lifting mechanism while a technician is working in the transfer cell 37.

Returning now to FIGS. 1, 2, and 3, the end effector storage station 10 described above allows storage of multiple end effectors 20 in a precise spatial location and in a horizontal and cantilevered position. An end effector 20 may be stored in the following manner: machine tool 15 and robot arm 17 having an end effector tool thereon travel along rails 18 to the storage end of manufacturing cell 12. The robot arm 17 positions the end effector 20 with a longitudinal axis into a storage cell 22 over an end effector holder 70 within the storage station 10. End effector 20 is thus located between the holding jaws 72 of a first end effector holder 70 described in detail above. In addition, the end effector 20 is positioned such that the end effector's longitudinal axis is normal to a plane formed by the vertical front faces of the holding jaws 72. When end effector 20 reaches the proper alignment between holding jaws 72, the jaws 72 are closed by the springs 85 and 87. More specifically, the central computer controller system allows compressed air to bleed from the air cylinder 82 such that the biased extension springs 85 and 87 pull the jaws 72 along the guide rail 77 to a closed holding position.

Support pins 107 and 110 on holding jaws 72 communicate with pin receiving holes 111 and 113 on end effector 20 (FIG. 7) such that the weight of the end effector 20 rests on the support pins 107 and 110. When holding jaws 72 are closed by the extension springs 85 and 87, the support pins 107 and 110 communicate with the support pin holes 111 and 113 such that the end effector 20 remains securely stored in the end effector holder 70.

As the robot arm 17 positions the end effector 20 in holding jaws 72, end effector sensors 112 sense when the end effector 20 is properly positioned or aligned and secured in holding jaws 72, the robot arm 17 disengages and separates from the end effector 20 such that the end effector 20 remains securely stored in the holder 70 in a horizontal and cantilevered position.

A similar storage process is used for a second end effector 210, shown in FIG. 11A, that interfaces with the second end effector holder 180 shown in FIG. 11 and described in detail above. More particularly, machine tool 15 and robot arm 17 position an end effector 210 with a longitudinal axis into a storage cell 22 of end effector storage station 10 (FIG. 1). The end effector is positioned over and set onto an end effector holder 180, as seen in FIG. 11, such that said end effector is in a horizontal and cantilevered position relative to the horizontal leg 187 of holder 180. An end effector sensor 207 in vertical leg 190 of holder 180 senses when the end effector is properly positioned and located on the end effect holder 180. The end effector 210 is secured onto holder 180 with end effector retainers, such as the annular flange 200 and radial ridge 202 discussed above.

Once in position, a key 205 extending from the bottom of cutout 197 communicates with a key receiving area on the end effector for proper alignment. When the end effector is effectively secured on the end effector holder 180 by the resulting friction in the interface between the flange 200 with annular groove 217 and the ridge 202 with annular channel 216 as described above, the end effector's longitudinal axis is normal to the vertical leg 190 of holder 180. When position sensor 207 indicates the end effector 210 is properly positioned in cutout 197 and thus secure, the computer controller enables the robot arm to disengage and separate from the end effector. Accordingly, the end effector 210 is left securely stored in a horizontal and cantilevered position within the end effector holder 180 such that the end effector 210 is located at a precise and known position in space.

The transport cart 40 and transport positioning unit 52, as shown in FIG. 12 and FIG. 13 and described above, may be utilized to remove an end effector from the storage station 10 for transportation to an outside location, such as a test bed area, without human contact. When an end effector transport unit 40 is positioned by cart positioning means 52 into an active storage cell position, the robot arm positions the end effector with a longitudinal axis over the holder 225 mounted to the end effector transport or cart 40 in the manner described above. The holder 225 secures the end effector in a horizontal and cantilevered position, and the scissor lift 240 lowers the cart 40 onto the floor position adjacent to the access door 45. The cart is then be withdrawn or moved out of the transport cell 37 through the door 45 and transported to a test bed site or any other desired location. Note that end effector transport unit 40 may be fitted with either of the end effector holders described above or any variations thereof.

The ability to precisely place an end effector on a transport cart by a computer controlled robot arm and remove the cart and end effector from storage station 10 avoids inaccurate end effector positioning that often occurs when a person manually removes or returns an end effector from or to a storage cell 37. Instead, the above described computer controlled process ensures that when the end effector is removed from and returned to the transport cell 37, and lifted to the active position, the end effector will return to a precise and known position in space that is recognized by the programmed machine tool and robot arm. Thus, any end effector may be taken out of and returned to the end effector storage station using the above transportation method quickly, easily, and accurately without having to reprogram or retest accuracy of the machining tool or machining operation.

Obviously, numerous modifications and variations of the end effector storage station disclosed herein will occur to those skilled in the art in view of this disclosure. Therefore it is expressly to be understood that these modifications and variations, and the equivalents thereof, may be practiced while remaining within the spirit and scope of the invention as defined in the following claims.

We claim:

1. An end effector storage station comprising:

a storage station frame forming a plurality of end effector storage cells, each of said end effector storage cells positioned to allow access by a numerical controlled machine tool utilizing one or more types of end effectors, and end effector holders located in said storage cells to hold an end effector in a predetermined location in space and in a horizontal and cantilevered position, said end effector holders including:

holding jaws that hold said end effector in said horizontal and cantilevered position, guides coupled to said holding jaws to linearly guide said holding jaws between an omen release position and a closed holding position, a mounting base, said guides being mounted to said mounting base, an opening mechanism coupled to said holding jaws to open said holding jaws along said guides, springs coupled to said holding jaws, said springs being biased to said closed holding position, sensors to sense when said end effector is properly positioned relative to said holding jaws, travel limiters to limit travel of said holding jaws along said guides, said travel limiters further comprising an outside stop to stop said holding jaws from opening past a predetermined position, and an inside stop to stop said holding jaws from closing past a predetermined position along said guides.

2. The end effector storage station of claim 1, said end effector holders further comprising:

holding jaws that hold said end effector in said horizontal and cantilevered position, guides coupled to said holding jaws to linearly guide said holding jaws between an open release position and a closed holding position, a mounting base, said guides being mounted to said mounting base, jaw positioners to position said holding jaws between a predetermined open position and a predetermined closed position, said jaw positioners including an opening mechanism coupled to said holding jaws to open said holding jaws along said guides, travel limiters to limit travel of said holding jaws beyond said predetermined open position and said predetermined closed position.

3. A method of securing in a horizontal and cantilevered position an end effector on an end effector transport and transporting said end effector to a remote location comprising:

positioning with robotic positioning means an end effector with a longitudinal axis over an end effector holder mounted on an end effector transport, said transport being positioned in a transport cell in an end effector storage station, said transport cell comprising:

a transport access means, transport positioning means to position said transport means into a predetermined location in space within said transport storage cell, and position sensors to sense said transport means is properly positioned within said transport storage cell;

said end effector transport comprising:
- a movable carrier with a top surface, and a said end effector holder coupled to said carrier top surface, sensors' to detect said transport properly located in said transport storage cell;

said end effector holder comprising:
- holding jaws that communicate with said end effector to hold said end effector in said horizontal and cantilevered position, said holding jaws further comprising vertical front faces,
- guides coupled to said holding jaws to linearly guide said holding jaws between an open release position and a closed holding position,
- mounting base, said guides being mounted to said mounting base,
- an opening mechanism coupled to said holding jaws to open said holding jaws along said guides,
- springs coupled to said holding jaws, said springs biased to said closed holding position,
- sensors to sense when said end effector is properly positioned relative to said holding jaws,
- travel limiters to limit travel of said holding jaws along said guides, said travel limiters further comprising an outside stop to stop said holding jaws from opening past a predetermined position, and an inside stop to stop said holding jaws from closing past a predetermined point along said guides, sensing with holding jaw sensors means said holding jaws in said open release position, positioning said end effector to a position between said holding jaws such that said end effector's longitudinal axis is normal to a plane formed by said vertical front faces of said holding jaws, closing said holding jaws with said springs such that support pins on said holding jaws communicate with support pin holes in said end effector, sensing with end effector sensors that said end effector is properly secured in a horizontal and cantilevered position relative to said holding jaws, separating said end effector from said robotic positioning means such that said end effector remains securely stored in said end effector holder mounted on said transport, positioning with said transport positioning means said movable carrier adjacent to said transport access means, moving said transport with said end effector secured thereto through said access means to a predetermined location.

4. The end effector storage station of claim 1, said mounting base further comprising:
- a top plate communicating with said end effector holders,
- a bottom plate communicating with said storage station frame,
- separators between said top and bottom plates, said separators comprising impact absorption means,
- springs coupled to said top and bottom plates, said springs biased to a forward nominal position,
- alignment means to align said top plate and bottom plate in said forward nominal position,
- jaw sensors coupled to said top plate to sense said holding jaws in said open release position.

5. The end effector storage station of claim 1 further comprising an end effector transport and a transport storage cell, said transport further comprising a movable carrier with a top surface, a said end effector holders coupled to said top surface, power access means to provide power to said transport when said transport is properly located in said transport storage cell;

said transport storage cell further comprising transport access means to provide said transport access to said transport storage cell, positioning means to position said transport in a predetermined location in space within said transport storage cell, and transport aligning means to properly align said transport within said transport storage cell.

6. An end effector storage station comprising:
- a storage station frame forming a plurality of end effector storage cells, each of said end effector storage cells positioned to allow access by a numerical controlled machine tool utilizing one or more types of end effectors, and
- end effector holders located in said storage cells to hold an end effector in a predetermined location in space and in a horizontal and cantilevered position, said end effector holders further comprising:
  - a holding plate with a vertical leg and a horizontal leg, said vertical leg further comprising a cutout shaped to communicate with said end effector, a key shaped to communicate with said end effector, end effector retainers to secure said end effector in said cutout, and sensors to sense when said end effector is properly located in said cutout,
- a guide rail coupled to said storage station frame,
- holding plate translator coupled to said holding plate and said guide rail,
- a blocking mechanism to block said holding plate from translating past a predetermined position,
- position normalizing means to return said holding plate to a predetermined position from a displaced position which said holding plate is displaced to when said end effector is placed in said holding plate.

7. The end effector storage station of claim 6, said end effector retainers further comprising a semi-circular radial ridge and a semi-circular annular flange disposed along said cutout, said semi-circular radial ridge being shaped to communicate with a corresponding annular channel in said end effector, and said semi-circular annular flange being shaped to communicate with a corresponding annular groove in said end effector.

8. A method of securing in a horizontal and cantilevered position an end effector on an end effector transport and transporting said end effector to a remote location comprising:
- positioning with robotic positioning means an end effector with a longitudinal axis over an end effector holder mounted on an end effector transport and said transport being positioned in a transport cell in an end effector storage station, said transport cell comprising:
  - a transport access means, transport positioning means to position said transport into a predetermined location in space within said transport cell, and position sensors to sense when said transport is properly positioned within said transport cell;
- said transport comprising:
  - a movable carrier with a top surface, and a said end effector holder coupled to said carrier top surface;
- said end effector holding means comprising:
  - a holding plate with a vertical leg and a horizontal leg, said vertical leg further comprising a cutout shaped to communicate with said end effector, a key shaped to communicate with said end effector, end effector retainers to secure said end effector in said cutout, and sensors to sense when said end effector is properly located in said cutout, a guide rail coupled to an end effector storage station, a holding plate translator coupled to said holding plate and said guide rail, a blocking mechanism to block said holding plate from translating past a predetermined position, position normalizing means to return said holding plate to a predetermined position from a displaced position which said holding plate is displaced to when said end effector is placed in said holding plate, positioning said end effector onto said end effector holder, securing with said end effector retaining said end effector on said end effector holder such that said end effector longitudinal axis is normal to said vertical leg, separating said end effector from said robotic positioning means such that said end effector remains securely stored, positioning with said transport positioning means in said transport cell said movable carrier adjacent to said transport access means, moving said transport with said end effector secured thereto through said access means to a predetermined location.

9. The end effector storage station of claim 1, said end effector holders further comprising:

a first end effector holder located in each of a first set of said storage cells to store a first end effector in a predetermined location in space and in a horizontal and cantilevered position, said first end effector storing means further comprising:

holding jaws that hold said first end effector in said horizontal and cantilevered position, each holding jaw further comprising a top and bottom support pin that directly interfaces with support pin holes in said first end effector, guides coupled to said holding jaws to linearly guide said holding jaws between an open release position and a closed holding position, a mounting base, said guides being mounted to said mounting base, an opening mechanism coupled to said holding jaws to open said holding jaws along said guides, springs coupled to said holding jaws, said springs biased to said closed holding position, sensors to sense when said end effector is properly positioned relative to said holding jaws, travel limiters to limit travel of said holding jaws along said guides; and a second end effector holder located in each of a second set of said storage cells to store a second end effector in a predetermined location in space and in a horizontal and cantilevered position, said second end effector holders further comprising:

a holding plate with a vertical leg and a horizontal leg, said vertical leg further comprising a cutout shaped to communicate with said end effector, a key shaped to communicate with said end effector thereby properly locating said end effector on said holding plate, end effector retainers to secure said end effector in said cutout, and sensors to sense when said end effector is properly located in said cutout, a guide rail coupled to said storage station frame, holding plate translating means coupled to said holding plate and said guide rail, a blocking mechanism to block said holding plate from translating past a predetermined position, position normalizing means to return said holding plate to a predetermined position.

10. The end effector storage station of claim 9 further comprising an end effector transport and a transport storage cell, said transport further comprising movable carrier with a top surface, a said first or second end effector holder coupled to said top surface, power access means to provide power to said transport when said transport is properly located in said transport storage cell;

said transport storage cell further comprising transport access means to provide said transport access to said transport cell, a positioning means to position said transport in a predetermined location in space within said transport storage cell, and transport aligning means to properly align said transport means within said transport storage cell.

11. The end effector storage station of claim 10 said mounting base of said first end effector further comprising:

a top plate coupled to said first end effector holder, a bottom plate coupled to said storage station frame, separators between said top and bottom plates, said separators comprising impact absorption means, position normalizing means coupled to said top plate and said bottom plate and biased to a predetermined position, alignment means coupled to said top plate and said bottom plate to align said top plate in said forward nominal position, jaw sensors coupled to said top plate to sense said holding jaws when in said open release position;

said second end effector retainers further comprising a semi-circular radial ridge and a semi-circular annular flange disposed along said cutout, said semi-circular radial ridge being shaped to communicate with a corresponding annular channel in said second end effector, and said semi-circular annular flange being shaped to communicate with a corresponding annular groove in said second end effector.

12. A method of storing an end effector in a horizontal and cantilevered position comprising:

positioning with robotic positioning means an end effector with a longitudinal axis over an end effector holder, said end effector holder comprising:

holding jaws that communicate with said end effector to hold said end effector in said horizontal and cantilevered position, said holding jaws further comprising vertical front faces, guides coupled to said holding jaws to linearly guide said holding jaws between an open release position and a closed holding position, a mounting base, said guides being mounted to said mounting base, an opening mechanism coupled to said holding jaws to open said holding jaws along said guides, springs coupled to said holding jaws, said springs biased to said closed holding position, end effector sensors to sense when said end effector is properly positioned relative to said holding jaws, travel limiters to limit travel of said holding jaws along said guides, said travel limiters further comprising an outside stop to stop said holding jaws from opening past a predetermined position, and an inside stop to stop said holding jaws from closing past a predetermined point along said guides, sensing with holding jaw sensors said holding jaws in said open release position, positioning said end effector to a position between said holding jaws such that said end effector's longitudinal axis is normal to a plane formed by said vertical front faces of said holding jaws, closing said holding jaws with said springs such that support pins on said holding jaws communicate with support pin holes in said end effector, sensing with said end effector sensors when said end effector is properly positioned in said holding jaws, separating said end effector from said robotic positioning means such that said end effector remains securely stored in said end effector holder in a horizontal and cantilevered position.

13. A method of storing an end effector in horizontal and cantilevered position comprising:

positioning with robotic positioning means an end effector with a longitudinal axis over an end effector holder, said end effector holder comprising:

a holding plate with a vertical leg and a horizontal leg, said vertical leg further comprising a cutout shaped to communicate with said end effector, a key shaped to communicate with said end effector, end effector retainers to secure said end effector in said cutout, and sensors to sense when said end effector is located in said cutout, a guide rail coupled to an end effector storage station, a holding plate translator coupled to said holding plate and said guide rail, a blocking mechanism to block said holding plate from translating past a predetermined position, position normalizing means to return said holding plate to a predetermined position;

sensing with said sensors when said end effector is located on said end effector holder, setting said end effector onto said end effector holder such that said end effector communicates with said key, securing with said end effector retainers said end effector onto said end effector holder such that said end effector longitudinal axis is normal to said vertical leg, separating said end effector from said robotic positioning means, said end effector being securely stored in said end effector holder in a horizontal and cantilevered position.

* * * * *